United States Patent
Kitamura

(10) Patent No.: US 9,016,802 B2
(45) Date of Patent: Apr. 28, 2015

(54) BICYCLE REAR HUB

(75) Inventor: Satoshi Kitamura, Osaka (JP)

(73) Assignee: Shimano Inc., Osaka (JP)

( * ) Notice: Subject to any disclaimer, the term of this patent is extended or adjusted under 35 U.S.C. 154(b) by 376 days.

(21) Appl. No.: 13/587,891

(22) Filed: Aug. 16, 2012

(65) Prior Publication Data

US 2013/0049448 A1  Feb. 28, 2013

(30) Foreign Application Priority Data

Aug. 29, 2011  (JP) .................................. 2011-186593

(51) Int. Cl.
*B60B 27/02* (2006.01)
*G01L 3/10* (2006.01)
*B60B 27/00* (2006.01)
*B60B 27/04* (2006.01)

(52) U.S. Cl.
CPC ............. *G01L 3/104* (2013.01); *B60B 27/0068* (2013.01); *B60B 27/023* (2013.01); *B60B 27/04* (2013.01); *B60B 2900/115* (2013.01); *G01L 3/109* (2013.01)

(58) Field of Classification Search
CPC .. B60B 27/02; B60B 27/0068; B60B 27/023; B60B 27/04; G01L 3/104; G01L 3/109
USPC .................. 301/110.5; 73/514.39, 862.29
See application file for complete search history.

(56) References Cited

U.S. PATENT DOCUMENTS

| | | | |
|---|---|---|---|
| 3,599,482 A * | 8/1971 | Rundell ................... 73/862.326 |
| 4,966,380 A * | 10/1990 | Mercat ........................ 280/259 |
| 5,065,633 A * | 11/1991 | Mercat ...................... 73/862.326 |
| 6,418,797 B1 | 7/2002 | Ambrosina et al. |
| 7,199,500 B2 * | 4/2007 | Yoshida ........................ 310/257 |
| 8,091,674 B1 * | 1/2012 | Zhang et al. ................. 180/220 |
| 8,278,789 B2 * | 10/2012 | Nakano ........................ 310/67 A |
| 8,336,400 B2 * | 12/2012 | Lassanske .................. 73/862.29 |
| 8,677,837 B2 * | 3/2014 | Mercat et al. ............ 73/862.338 |
| 2005/0275561 A1 | 12/2005 | Kolda et al. |
| 2005/0285461 A1 | 12/2005 | Kitamura et al. |
| 2011/0120232 A1 | 5/2011 | Lassanske |
| 2011/0174110 A1 * | 7/2011 | Benkert et al. ............... 74/594.2 |

FOREIGN PATENT DOCUMENTS

| | | |
|---|---|---|
| CN | 1229914 A | 9/1999 |
| DE | 3150149 A1 | 6/1983 |
| DE | 44 31 029 A1 | 3/1996 |
| EP | 1545076 A2 * | 6/2005 |
| JP | 2007-255953 A | 10/2007 |
| TW | M332625 A1 | 5/2008 |

* cited by examiner

*Primary Examiner* — Kip T Kotter
(74) *Attorney, Agent, or Firm* — Global IP Counselors

(57) ABSTRACT

A bicycle rear hub includes a hub spindle, a drive part, a hub shell and a driving force measuring part. The drive part is rotatably supported on the hub spindle, and configured to receive a driving-force-input member. The hub shell is rotatably supported on the hub spindle and operatively coupled to the drive part for rotation by the drive part on the hub spindle. The driving force measuring part includes a first signal generating mechanism and a second signal generating mechanism. The first signal generating mechanism has a first magnet and a first coil. The second signal generating mechanism has a second magnet and a second coil. The second signal generating mechanism is axially aligned with the first signal generating mechanism in an axial direction of the hub spindle.

15 Claims, 8 Drawing Sheets

BICYCLE REAR HUB

CROSS-REFERENCE TO RELATED APPLICATIONS

This application claims priority under 35 U.S.C. §119 to Japanese Patent Application No. 2011-186593, filed Aug. 29, 2011. The entire disclosure of Japanese Patent Application No. 2011-186593 is hereby incorporated herein by reference.

BACKGROUND

1. Field of the Invention

This invention generally relates to a bicycle hub. More specifically, the present invention relates to a rear bicycle hub constituting the hub for a rear wheel of a bicycle.

2. Background Information

A rear hub for a bicycle is provided with a hub spindle disposed at the center of rotation of the rear wheel; a hub shell installed rotatably about the hub spindle; and a freewheel disposed adjacently to the hub shell in the axial direction. Rotation of a sprocket, which is engaged with a chain, is delivered to the hub shell by the freewheel. There is known in the prior art a rear hub for a bicycle in which a driving force measuring part capable of measuring driving force of a rider is disposed between the freewheel and the hub shell (see U.S. Pat. No. 6,418,797, for example).

The prior art rear hub for a bicycle has a coupling member for coupling the freewheel and the hub shell. The coupling member is formed to a hollow cylindrical shape, and the sprocket is installed on one end part thereof, while the other end part is coupled to the hub shell. The coupling member is disposed with a strain gauge for detecting twisting of a coupling part thereof, and detects the amount of twist of the coupling part. Driving force of a rider is measured from the amount of twist measured thereby.

SUMMARY

In the rear hub of the prior art, the strain gauge is affixed directly to the coupling part, and because it is necessary, for example, for the adhesive used for adhesion purposes to be made uniform in thickness, accuracy in assembly is difficult.

It is an object of the present invention to afford a bicycle rear hub, capable of measuring driving force in a manner largely unaffected by accuracy of assembly.

In accordance with a first aspect of the invention, a bicycle rear hub is provided that basically comprises a hub spindle, a drive part, a hub shell and a driving force measuring part. The drive part is rotatably supported on the hub spindle, and configured to receive a driving-force-input member. The hub shell is rotatably supported on the hub spindle and operatively coupled to the drive part for rotation by the drive part on the hub spindle. The driving force measuring part includes a first signal generating mechanism and a second signal generating mechanism. The first signal generating mechanism has a first magnet and a first coil. The second signal generating mechanism has a second magnet and a second coil. The second signal generating mechanism is axially aligned with the first signal generating mechanism in an axial direction of the hub spindle.

With this bicycle rear hub, when driving force is conveyed from the drive part to the hub shell, a phase difference that is reflective of the driving force is generated between a first signal produced by the first coil of the first signal generating mechanism, and a first signal generated by the second coil of the second signal generating mechanism, which mechanisms are disposed in-line in the hub spindle direction. Driving force can be measured by detecting this phase difference. Herein, measurement of driving force can take place in a non-contact manner by two sets of coils and magnets, and can therefore be largely unaffected by accuracy of assembly.

The bicycle rear hub according to a second aspect of the invention is the bicycle rear hub as recited in the first aspect, wherein the first signal generating mechanism is coupled to the drive part.

The bicycle rear hub according to a third aspect of the invention is the bicycle rear hub as recited in the second aspect, wherein either the first magnet or the first coil is disposed to the drive part, and the remaining first magnet or the first coil is disposed to the hub spindle. Where the first magnet is disposed to the rotating drive part, and first coil is disposed to the non-rotating hub spindle, the wiring is more readily routed out from the first coil.

The bicycle rear hub according to a fourth aspect of the invention is the bicycle rear hub as recited in the first aspect, wherein the drive part has a coupling part coupled to the hub shell. In this case, by facilitating torsion of the coupling part, which conveys the driving force, detection of the phase difference of the first signal generating mechanism and the second signal generating mechanism is facilitated.

The bicycle rear hub according to a fifth aspect of the invention is the bicycle rear hub as recited in the fourth aspect, wherein the first signal generating mechanism is coupled to the coupling part.

The bicycle rear hub according to a sixth aspect of the invention is the bicycle rear hub as recited in the fifth aspect, wherein either the first magnet or the first coil is disposed to the coupling part, and the remaining first magnet or the first coil is disposed to the hub spindle. Where the first magnet is disposed to the rotating coupling part, and first coil is disposed to the non-rotating hub spindle, the wiring is more readily routed out from the first coil.

The bicycle rear hub according to a seventh aspect of the invention is the bicycle rear hub as recited in the fourth to sixth aspects, wherein the second signal generating mechanism is coupled to the coupling part.

The bicycle rear hub according to an eighth aspect of the invention is the bicycle rear hub as recited in the seventh aspect, wherein either the second magnet or the second coil is disposed to the coupling part, and the remaining second magnet or the second coil is disposed to the hub spindle. Where the second coil is disposed to the non-rotating hub spindle, the wiring is more readily routed out from the second coil.

The bicycle rear hub according to a ninth aspect of the invention is the bicycle rear hub as recited in any of the fourth to sixth aspects, wherein the second signal generating mechanism is coupled to the hub shell.

The bicycle rear hub according to a tenth aspect of the invention is the bicycle rear hub as recited in the ninth aspect, wherein either the second magnet or the second coil is disposed to the hub shell, and the remaining second magnet or the second coil is disposed to the hub spindle. Where the second coil is disposed to the non-rotating hub spindle, the wiring is more readily routed out from the second coil.

The bicycle rear hub according to an eleventh aspect of the invention is the bicycle rear hub as recited in any of the first to tenth aspects, wherein the first signal generating mechanism and the second signal generating mechanism are disposed to the interior of the hub shell. In so doing, the two signal generating mechanisms are easily made watertight.

The bicycle rear hub according to a twelfth aspect of the invention is the bicycle rear hub as recited in any of the first to eleventh aspects, wherein the first magnet and the second magnet are formed to annular shape, and a plurality of magnetic poles are formed in-line in the circumferential direction.

The bicycle rear hub according to a thirteenth aspect of the invention is the bicycle rear hub as recited in any of the first to twelfth aspects, further provided with a wireless transmitter for wirelessly transmitting, to the outside, information based on an output of the first coil and the second coil. Even it for example, the first coil and the second coil rotate in unison with the hub shell, the output thereof can be readily routed to the outside. Moreover, in a case in which the first coil and the second coil are installed on the hub spindle, the wireless transmitter can be disposed to the outside of the hub shell, facilitating the transmitting of radio waves to an external device such as a cycle computer or the like.

The bicycle rear hub according to a fourteenth aspect of the invention is a bicycle rear hub as recited the thirteenth aspect, further provided with a power supply for supplying power to the wireless transmitter. In this case, because a power supply is disposed, there is no need to furnish a power supply separately from the rear hub.

The bicycle rear hub according to a fifteenth aspect of the invention is a bicycle rear hub as recited in the fourteenth aspect, wherein the power supply is a battery. In this case, the structure of the power supply is simpler.

The bicycle rear hub according to a sixteenth aspect of the invention is a bicycle rear hub as recited in the fourteenth aspect, wherein the power supply is a generator. In this case, power is generated during travel of the bicycle, and therefore the need for external charging, or to replace a battery, is obviated.

With the bicycle rear hub of this present disclosure, driving force can be measured in non-contact fashion by two sets of coils and magnets, and can therefore be relatively unaffected by accuracy of assembly.

BRIEF DESCRIPTION OF THE DRAWINGS

Referring now to the attached drawings which form a part of this original disclosure:

FIG. 1 is a half cross sectional view of a bicycle rear hub in accordance with a first embodiment, on which sprockets have been installed;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
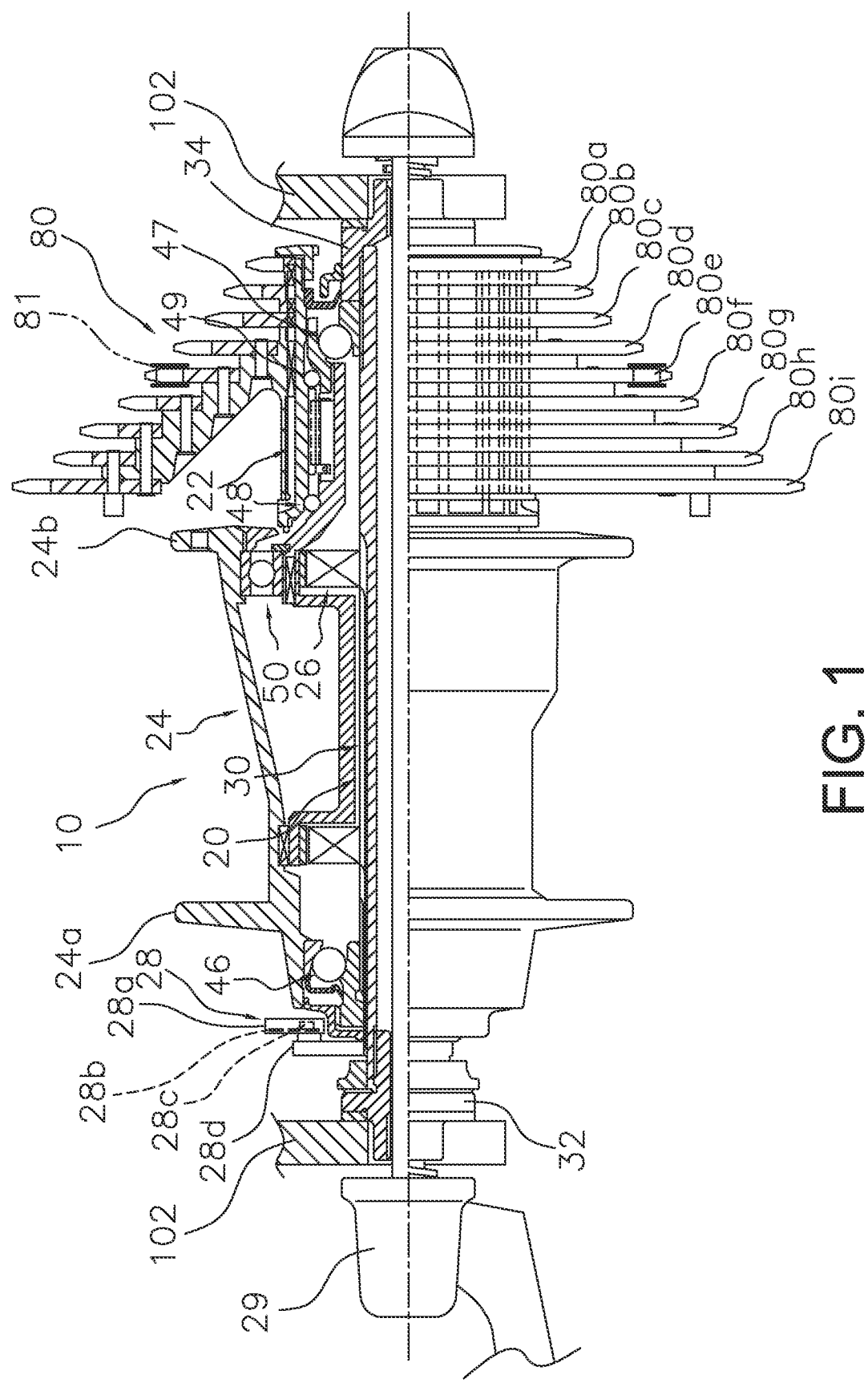
FIG. 1 is a side elevational view of a bicycle that is equipped with in accordance with one embodiment.

Referring initially to FIG. 1, a bicycle rear hub 10 is illustrated in accordance with a first embodiment. As shown in FIG. 1, the rear hub 10 is installable on a hub spindle mounting section 102 that is disposed to the rear part of the frame of a bicycle. The rear hub 10 is provided with a hub spindle 20; a drive part 22; a hub shell 24; a driving force measuring part 26; and a wireless transmitter 28. The hub shell 24 is rotatably supported on the hub spindle 20 by a first bearing 46. The drive part 22 is rotatably supported on the hub spindle 20 by a second bearing 47. The driving force measuring part 26 is capable of measuring the driving force of a rider. The wireless transmitter 28 wirelessly transmits information relating to measured driving force. The wirelessly transmitted information relating to driving force is displayed, for example, on a cycle computer, not shown, that is installable on the handlebar of the bicycle. Information such as speed of the bicycle, rotation speed of the crank (cadence), travel distance, and the like, is displayed on the cycle computer as well.

Figure 2:
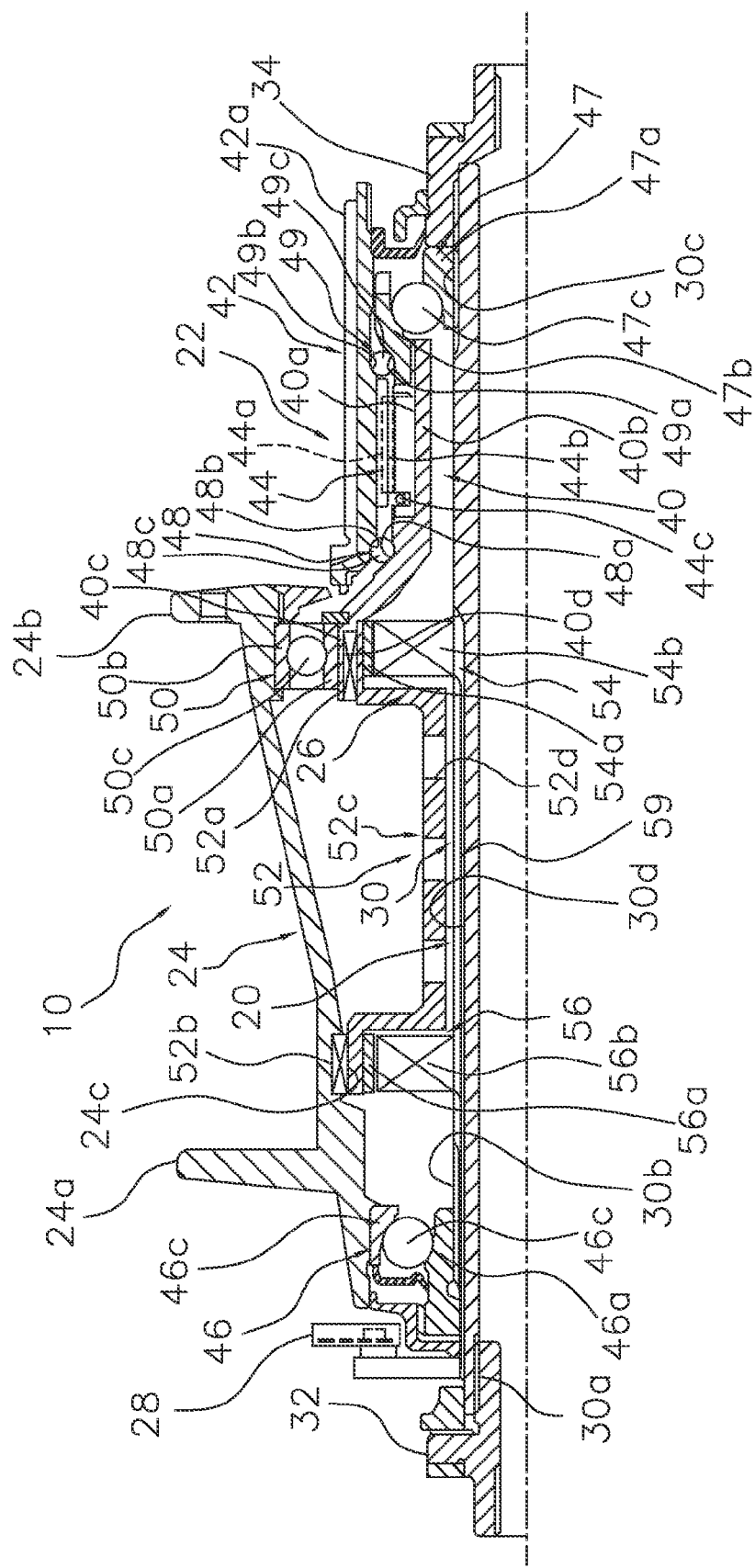
FIG. 2 is a fragmentary cross sectional view of the bicycle rear hub.

The hub spindle 20 has a hollow spindle body 30 with a quick release mechanism 29 installed thereon; a first lock nut 32 installed at a first end of the spindle body 30 (the end at the left side in FIG. 2); and a second lock nut 34 installed at a second end of the spindle body 30 (the end at the right side in FIG. 2). The hub spindle mounting section 102 is designed to install onto the first lock nut 32 and the second lock nut 34. Herein, a configuration whereby the first lock nut 32 and the second lock nut 34 install into the hub spindle mounting section 102 is disclosed, but a configuration whereby the spindle body 30 installs into the hub spindle mounting section 102 on the frame would be acceptable as well.

As shown in FIG. 2, a female thread part 30a is formed on the inside peripheral face of the first end of the spindle body 30. A first male thread part 30b and a second male thread part 30c are formed respectively on the outside peripheral faces of the first and second ends of the spindle body 30. The first lock nut 32 has a male thread part that threadably mates with the female thread part 30a, and is threadedly fastened onto the spindle body 30. The second lock nut 34 has a female thread part that threadably mates with the second male thread part 30c, and is threadedly fastened onto the spindle body 30. On the outside peripheral face of the spindle body 30, a groove 30d is formed along the hub spindle direction, towards the inside peripheral side of the drive part 22 from the first end (the end at the left side in FIG. 2). The groove 30d is disposed for passage of electrical wiring 59 for the driving force measuring part 26 and the wireless transmitter 28.

The configuration of the drive part 22 includes a member called a freewheel. The drive part 22 has a first member 40 rotatably supported on the hub spindle 20; a second member 42 disposed to the outside peripheral side from the first member 40; a one-way clutch 44 disposed between the first member 40 and the second member 42; and a coupling part 52.

The first member 40 is a member of tubular shape rotatably supported on the hub spindle 20 by the second bearing 47. The second bearing 47 has a second inner race element 47a, a second outer race element 47b, and a plurality of second rolling elements 47c. The second inner race element 47a has a thread formed on the outside peripheral part thereof, and is threadedly fastened to the second male thread part 30c of the spindle body 30. The second outer race element 47b has a thread formed on the inside peripheral part thereof, and is threadedly fastened to a male thread part formed on the outside peripheral face of the first member 40. The second rolling elements 47c, spaced apart at intervals in the circumferential direction, are disposed between the second inner race element 47a and the second outer race element 47b. The second rolling elements 47c are rotatably retained by a retainer, not shown, and are disposed spaced apart at predetermined intervals in the circumferential direction. The second rolling elements 47c may be spherical elements, or rollers.

The first member 40 has a first tubular part 40b provided in the outside peripheral part thereof with a recess 40a for housing a clutch pawl 44a of the one-way clutch 44. A first end of the first member 40 (the end on the left side in FIG. 2) extends as far as the inside peripheral side of the hub shell 24. The first member 40, at a first end of the first tubular part 40b (the end on the left side in FIG. 2), has a second tubular part 40c larger in diameter than the first tubular part 40b. On the outside peripheral face of a boundary section of the first tubular part 40b and the second tubular part 40c, there is formed a third cone face 48a constituting a third bearing 48. On the outside peripheral face of a boundary section of the first tubular part 40b and the second tubular part 40c, there is formed the third cone face 48a of the third bearing 48 that rotatably supports the second member 42. On the outside face of the second tubular part 40c, there is installed a fifth inner race element 50a of a fifth bearing 50 that rotatably supports the hub shell 24. The fifth bearing 50 is a commercially available ball bearing having the fifth inner race element 50a; a fifth outer race element 50b installed on the inside peripheral face of the hub shell 24; and a plurality of fifth spherical elements 50c. On the inside peripheral face of the second tubular part 40c, there is formed a first rotation coupling part 40d to which a second end of the coupling part 52 (the end at the right side in FIG. 2) is coupled. The coupling part 52 rotates in unison with the first member 40.

The second member 42 is a member of tubular shape rotatably supported with respect to the first member 40, by the third bearing 48 and a fourth bearing 49. The third bearing 48 is formed by the third cone face 48a mentioned previously, a third cup face 48b, and a plurality of third rolling elements 48c. The third cup face 48b is formed on the inside peripheral face of a first end of the second member 42 (the end at the left side in FIG. 2). The third rolling elements 48c, spaced apart at intervals in the circumferential direction, are disposed between the third cone face 48a and the third cup face 48b. The third rolling elements 48c are rotatably retained by a retainer, not shown, and are disposed spaced apart at predetermined intervals in the circumferential direction. The third rolling elements 48c may be spherical elements, or rollers.

The fourth bearing 49 is formed by a fourth cone face 49a formed on the outside peripheral face of the second outer race element 47b, a fourth cup face 49b, and a plurality of fourth rolling elements 49c. The fourth cup face 49b is formed on the inside peripheral face of the second member 42, in the medial part thereof in the direction of the hub spindle. The fourth rolling elements 49c, spaced apart at intervals in the circumferential direction, are disposed between the fourth cone face 49a and the fourth cup face 49b. The fourth rolling elements 49c are rotatably retained by a retainer, not shown, and are disposed spaced apart at predetermined spacing in the circumferential direction. The fourth rolling elements 49c may be spherical elements, or rollers.

As shown in FIG. 1, the second member 42 has on the outside peripheral face thereof a sprocket installation part 42a adapted for installation of a sprocket assembly 80. The sprocket assembly 80 rotates in unison with the second member 42. The sprocket assembly 80 is one example of the driving-force-input member. The sprocket installation part 42a has, for example, splines which are disposed on the outside peripheral face thereof, and which have projecting parts or recessed parts spaced apart at intervals in the circumferential direction. As shown in FIG. 1, the sprocket assembly 80 has several (e.g., nine) sprockets 80a to 80i with different numbers of teeth. Rotation of the crank, not shown, is conveyed to the drive part 22 by meshing of a chain 81 with any sprocket of the sprocket assembly 80. Herein, a plurality of sprockets are installed on the sprocket installation part 42a, but the number of sprockets installed on the sprocket installation part 42a may be one.

As shown in FIG. 2, the one-way clutch 44 is disposed for the purpose of conveying, to the first member 40, only rotation of the second member 42 in the direction of advance of the bicycle. In so doing, only rotation of the crank in the direction of advance is conveyed to the hub shell 24. Rotation of the hub shell 24 in the direction of advance is not conveyed to the second member 42. The one-way clutch 44 has a clutch pawl 44a disposed rockably between a first attitude and a second attitude in the recess 40a, ratchet teeth 44b formed on the inside peripheral face of the second member 42, and an urging member 44c for urging the clutch pawl 44a. The clutch pawl 44a contacts the ratchet teeth 44b when in the first attitude, and disengages from the ratchet teeth 44b when in the second attitude. The urging member 44c is installed in an annular groove formed in the first member 40. The urging member 44c is a spring member formed by bending a metal wire material to a "C" shape, and urges the clutch pawl 44a towards the first attitude.

The coupling part 52 is disposed on the driving force conveying path from the drive part 22 to the hub shell 24. The coupling part 52 is coupled at a first end (the end on the left side in FIG. 2) to the hub shell 24, and coupled at a second end (the end on the right side in FIG. 2.) to the second tubular part 40c of the first member 40. The coupling part 52 and the first member 40 rotate in unison. In this embodiment, the coupling part 52 is disposed from a first end of the second tubular part 40c of the first member 40 to the first end (the end on the left side in FIG. 1) side from the center of the hub shell 24 in the direction of the hub spindle, and couples the inside peripheral part of the first end of the second tubular part 40c and the inside peripheral part of the hub shell 24.

Figure 3:
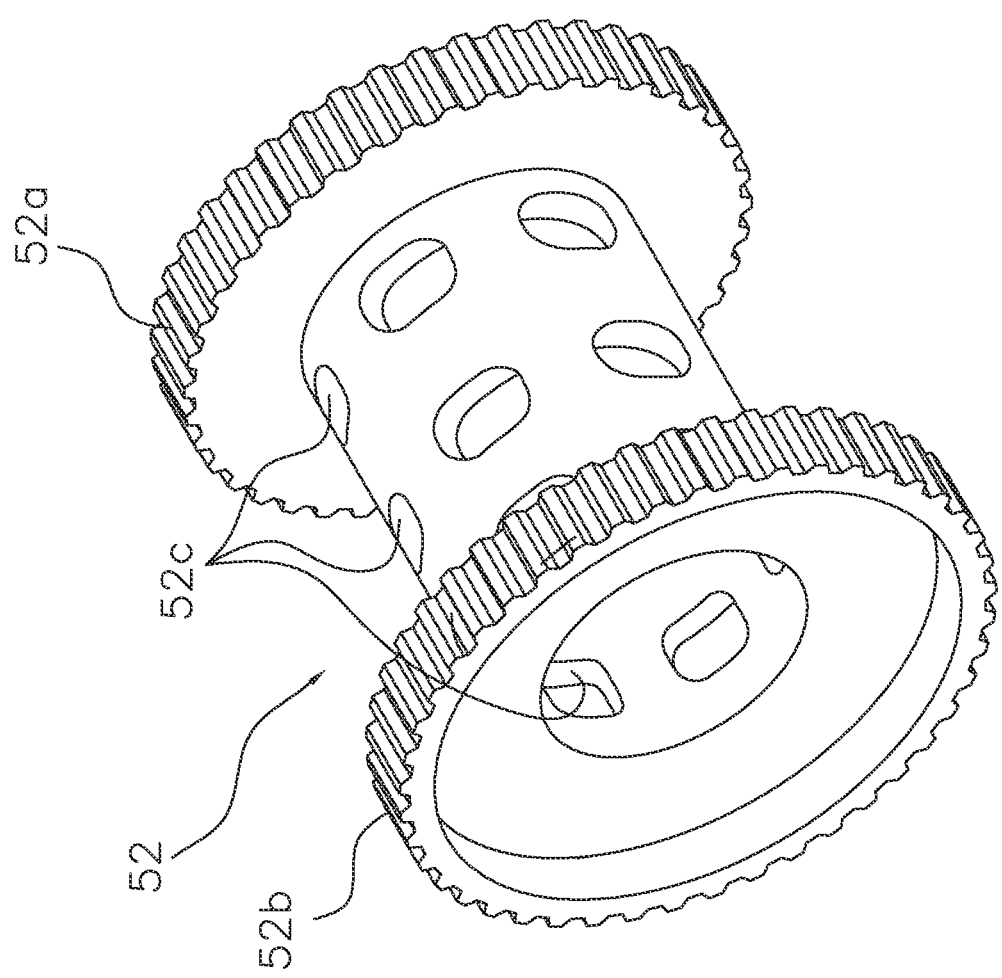
FIG. 3 is a perspective view of a coupling part of the bicycle rear hub.

As shown in FIG. 3, the coupling part 52 is a member of tubular shape. The coupling part 52 has a first engaging part 52a of tubular shape; a second engaging part 52b of tubular shape formed spaced apart by an interval from the first engaging part 52a; and a coupling tube part 52c coupling the first engaging part 52a and the second engaging part 52b. The coupling tube part 52c is of a shape adapted to couple the first engaging part 52a and the second engaging part 52b, and may be replaced, for example, by a plurality of rod members disposed about the hub spindle.

The first engaging part 52a is formed such that a first rotational coupling part 40d of the second tubular part 40c is engageable with the second end of the coupling part 52 (the end on the right side in FIG. 3). The second engaging part 52b is formed such that a second rotational coupling part 24c, discussed below, of the hub shell 24 is engageable with the first end of the coupling part 52 (the end on the left side in FIG. 3). The first engaging part 52a and the second engaging part 52b have either recessed parts that are recessed, or protruding parts that project out, in the radial direction of the hub spindle 20. In the present embodiment, the first engaging part 52a and the second engaging part are formed to a recessed/ protruding shape in the radial direction of the hub spindle 20. Herein, the first engaging part 52a and the second engaging part 52b are formed to a recessed/protruding shape in the radial direction of the hub spindle 20, but a shape having recessed parts or protruding parts projecting in the direction of the hub spindle would be acceptable, as would be serrations.

The coupling tube part 52c is smaller in diameter than the first engaging part 52a and the second engaging part 52b. A plurality of holes 52d, spaced apart at intervals in the circumferential direction, are formed in the coupling tube part 52c. The holes 52d are oval in shape and elongated in the circumferential direction, and pass through the coupling tube part 52c. In this embodiment, the holes 52d are respectively disposed to the center part of the coupling tube part 52c, and to the first end side and the second end side of the coupling tube part 52c, to either side of the center part thereof. These holes 52d are disposed in order to facilitate torsion of the coupling part 52 in response to driving force, when driving force (torque) is conveyed from the drive part 22 to the hub shell 24.

Figure 4:
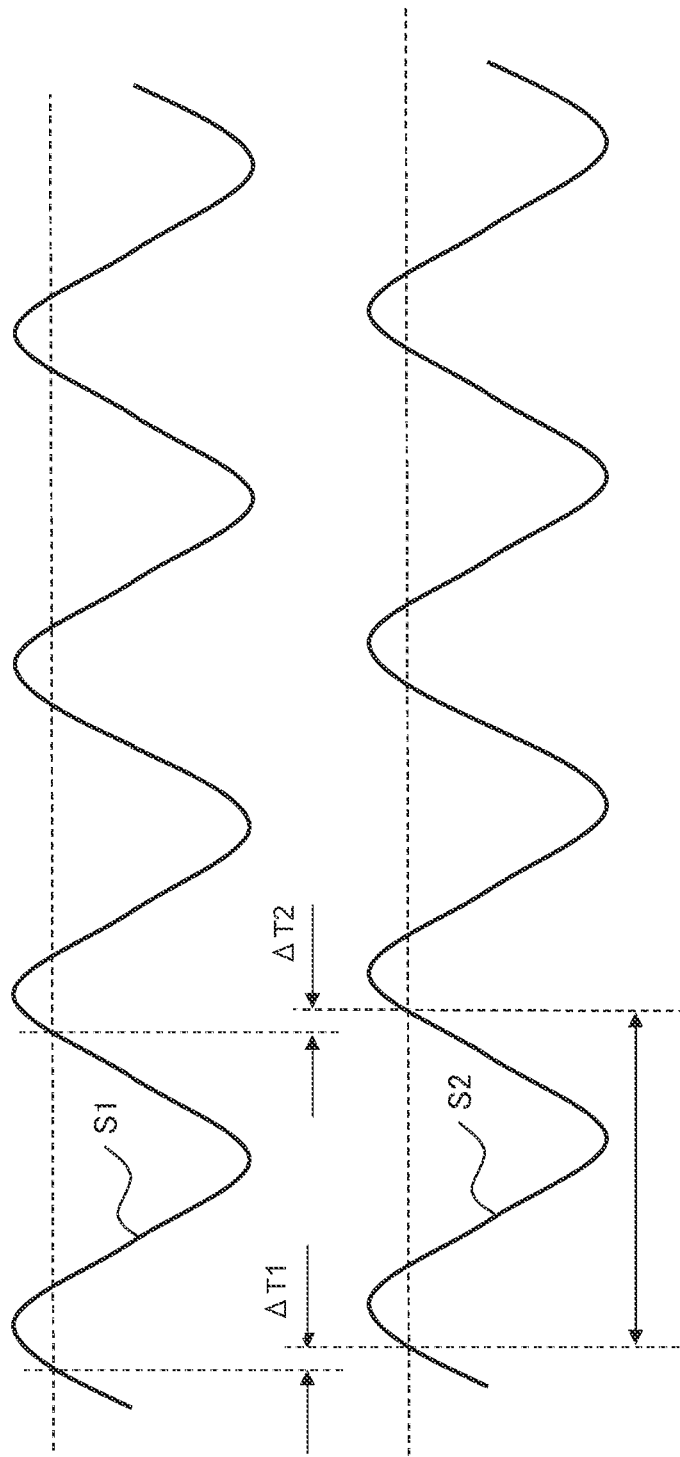
FIG. 4 is a diagram showing an example of waveforms of a first phase difference signal and a second phase difference signal.

The hub shell 24 may have a one-piece structure, or a structure that is splittable in the direction of the hub spindle (in FIGS. 2 and 4, the structure has been modified, as there is no particular need for splittable design). As shown in FIG. 2, the hub shell at a first end thereof (the end at the left side in FIG. 2) is supported rotatably about the spindle body 30 of the hub spindle 20, by the first bearing 46. As mentioned previously, the second end of the hub shell (the end at the right side in FIG. 2) is supported rotatably about the spindle body 30 of the hub spindle 20, via the drive part 22, by the fifth bearing 50. The first bearing 46 has a thread formed on its inside peripheral face, and has a first inner race element 46a threadedly fastened onto the first male thread part 30b of the spindle body 30; a first outer race element 46b; and a plurality of first rolling elements 46c. The first rolling elements 46c are rotatably retained by a retainer, not shown, and are disposed at predetermined intervals in the circumferential direction. The first rolling elements 46c may be spherical elements, or rollers.

In the outside peripheral part of the hub shell 24, a first hub flange 24a and a second hub flange 24b adapted to couple with the spokes of the rear wheel of the bicycle are formed spaced apart at an interval in the axial direction of the hub spindle 20, and project in annular fashion therefrom. The second rotational coupling part 24c, which is adjacent to the first bearing 46 and coupled to the second end of the coupling part 52, is formed on the inside peripheral part of a first end inside the hub shell 24 (the end at the left side in FIG. 2).

The driving force measuring part 26 has a first signal generating mechanism 54 and a second signal generating mechanism 56. The first signal generating mechanism 54 and the second signal generating mechanism 56 are disposed in-line in the direction of the hub spindle. The first signal generating mechanism 54 and the second signal generating mechanism 56 are disposed spaced apart by a predetermined interval in the direction of the hub spindle. In preferred practice, the first signal generating mechanism 54 and the second signal generating mechanism 56 will have identical specifications, to the extent it is possible to do so. In the first embodiment, the first signal generating mechanism 54 and the second signal generating mechanism 56 are coupled to the coupling part 52.

The first signal generating mechanism 54 is disposed to the inside peripheral side from the first engaging part 52a of the coupling part 52. The first signal generating mechanism 54 has the same mechanism as a so-called dynamo. The first signal generating mechanism 54 has a first magnet 54a and a first coil 54b. The first magnet 54a is coupled to the inside peripheral part of the first engaging part 52a, and rotates in unison with the first engaging part 52a. The first magnet 54a is formed to annular shape, and has a plurality of magnetic poles formed in-line in the circumferential direction. The first magnet 54a is formed, for example, by a permanent magnet that is formed with N poles and S poles lined up in alternating fashion in the circumferential direction.

The first coil 54b is disposed on the outside peripheral face of the spindle body 30 of the hub spindle 20, at a position in opposition to the first magnet 54a, to the inside peripheral side of the first magnet 54a. The first coil 54b is non-rotatably coupled to the spindle body 30. The first coil 54b has a coil bobbin fastened to the outside peripheral face of the spindle body 30; a detection coil wound onto the coil bobbin; and a yoke disposed about the perimeter of the detection coil.

The second signal generating mechanism 56 is disposed to the inside peripheral side from the second engaging part 52b of the coupling part 52. The second signal generating mechanism 54 has the same mechanism as a so-called dynamo. The second signal generating mechanism 56 has a second magnet 56a and a second coil 56b. The first magnet 56a is coupled to the inside peripheral part of the second engaging part 52b, and rotates in unison with the second engaging part 52b. The second magnet 56a is formed to annular shape, and has a plurality of magnetic poles formed in-line in the circumferential direction. The second magnet 56a is formed, for example, by a permanent magnet that is formed with N poles and S poles lined up in alternating fashion in the circumferential direction, and is similar in configuration to the first magnet 54a.

The second coil 56b is disposed on the outside peripheral face of the spindle body 30 of the hub spindle 20, at a position in opposition to the second magnet 56a, to the inside peripheral side of the second magnet 56a. The second coil 56b is non-rotatably coupled to the spindle body 30. The second coil 56b has a coil bobbin fastened to the outside peripheral face of the spindle body 30; a detection coil wound onto the coil bobbin; and a yoke disposed about the perimeter of the detection coil.

The driving force measuring part 26 measures the driving force by detecting, in the form of an electrical signal, a difference between a first phase signal output from the first coil 54b of the first signal generating mechanism 54 and a second phase signal output from the second coil 56b. The driving force includes torque.

As shown in FIG. 1, the wireless transmitter 28 is disposed, for example, to the outside from the first end of the hub shell 24 in the direction of the hub spindle. The wireless transmitter 28 has a case 28a fastened to the outside peripheral part of the hub spindle 20. The case 28a has a fastening part 28d for fastening to the hub spindle 20. The spindle body 30 is passed through the fastening part 28d. By tightening the first lock nut 32, the fastening part 28d is fastened by being clamped directly or indirectly between the first lock nut 32 and the first outer race element 46a. A circuit board 28b is disposed within the case 28a. The circuit board 28b is connected to the first coil 54b and the second coil 56b by electrical wiring 59 passed through the groove 30d.

On the circuit board 28b are installed electronic components such as a microcomputer; an amplifier for amplifying the first phase signal and the second phase signal; an analog-digital (AD) conversion circuit for converting the signal amplified by the amplifier to a digital signal; a phase difference detection circuit for deriving the phase difference of the first phase signal and the second phase signal, based on a digital signal output from the AD conversion circuit; a wireless transmission circuit, and the like; as well as a rechargeable battery 28c as the power supply. The phase difference detection circuit may be included in the microcomputer. In the present embodiment, the microcomputer, the amplifier, the AD conversion circuit, and the phase difference detection circuit constitute part of the driving force measuring part 26. The driving force measuring part 26 may be provided as well with a logic circuit that outputs a signal representing the phase difference, when the first phase signal and the second phase signal are input. The wireless transmitter 28 wirelessly transmits information based on the phase difference ΔT1 (ΔT2) between the first phase signal S1 and the second phase signal S2 shown in FIG. 4. The information wirelessly transmitted from the wireless transmitter 28 is displayed by a cycle computer, not shown, as driving force, torque, and/or power. Based on the phase difference ΔT1 (ΔT2), the driving force, torque, and/or power may be calculated in the microcomputer disposed to the circuit board 28b; or the driving force, torque, and/or power may be calculated in the cycle computer, based on the received information.

A primary battery may be disposed in place of the rechargeable battery 28c. The rechargeable battery 28c or the primary battery is detachably disposed to the case 28a. The case 28a may be disposed, for example, with terminals employed when charging the rechargeable battery 28c. Power generated by the first signal generating mechanism 54 or the second signal generating mechanism 56 may be rectified for use as a power supply. Furthermore, the power generated by the first signal generating mechanism 54 or the second signal generating mechanism 56 may be stored in the rechargeable battery 28c.

In the rear hub 10 configured in this manner, when the rider pedals the pedals attached to the bicycle, the rider's tread force is conveyed as driving force from the drive part 22 to the hub shell 24. At this time, the coupling part 52 of the drive part 22 experiences torsion, and a phase difference ΔT1 (ΔT2) reflective of the driving force arises between the first phase signal S1 output by the first coil 54b and the second phase signal S2 output by the second coil 56b. This phase difference ΔT1 (ΔT2) varies according to the torsion of the coupling part 52. In more specific terms, as torsion of the coupling part 52 increases, the phase difference ΔT1 (ΔT2) increases, and as torsion of the coupling part 52 decreases, the phase difference ΔT1 (ΔT2) decreases. Information based on this phase difference ΔT1 (ΔT2) is wirelessly transmitted to the cycle computer by the wireless transmitter 28. In the cycle computer, the wirelessly transmitted information representing the driving force is received and displayed. The rider can thereby be apprised of the self-generated driving force, torque, power, and the like.

Herein, because two sets of coils and magnets can measure the driving force in a non-contact manner, they can be relatively unaffected by accuracy of assembly.

Figure 5:
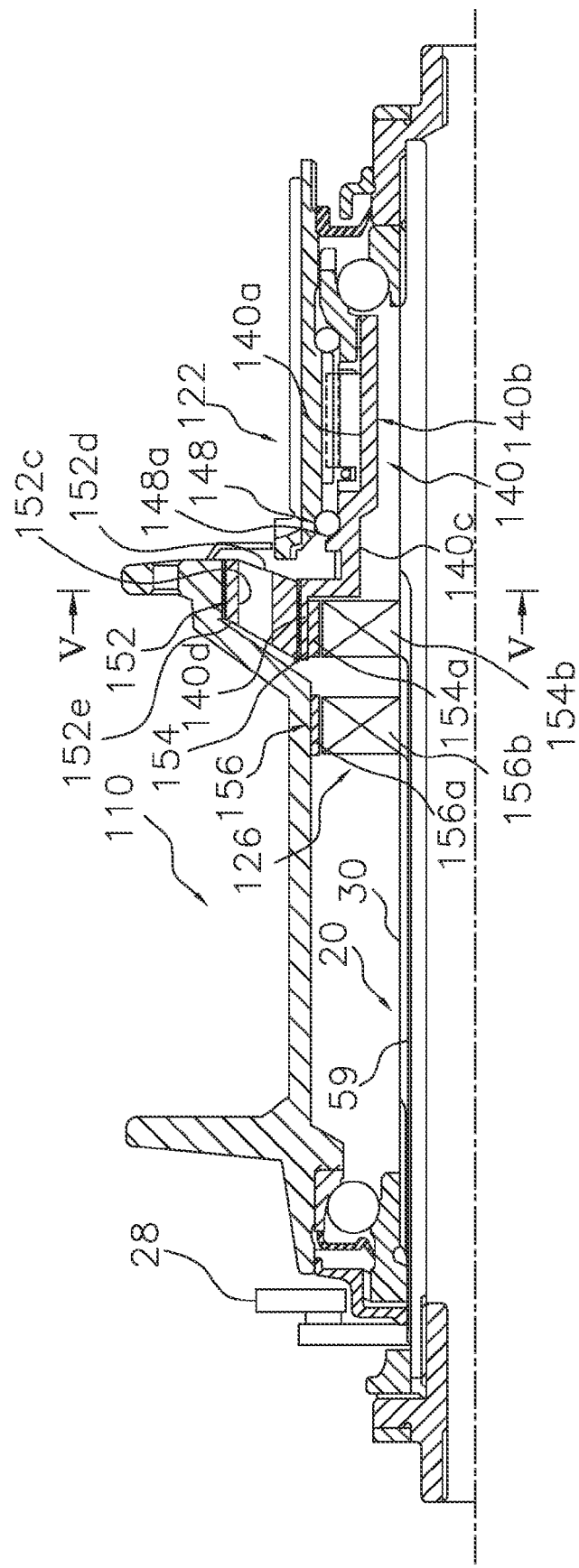
FIG. 5 is a fragmentary cross sectional view, corresponding to FIG. 2, of a bicycle rear hub in accordance with a second embodiment.

As shown in FIG. 5, a rear hub 110 of a second embodiment is illustrated. This rear hub 110 is provided with a drive part 122 that is coupled to a hub shell 124. The drive part 122 has a coupling part 152 that is coupled to a hub shell 124 at second end of the hub shell 124 (the end at the right side in FIG. 5). In the following description, descriptions of members of configuration and shape of the second embodiment that are comparable to those of the first embodiment are omitted.

In the rear hub 110, a first member 140 of the drive part 122 has a first tubular part 140b provided with a recess 140a. The first member 140 has a second tubular part 140c larger in diameter than the first tubular part 140b, and a third tubular part 140d larger in diameter than the second tubular part 140c. The second tubular part 140c is disposed between the first tubular part 140b and the third tubular part 140d.

Figure 6:
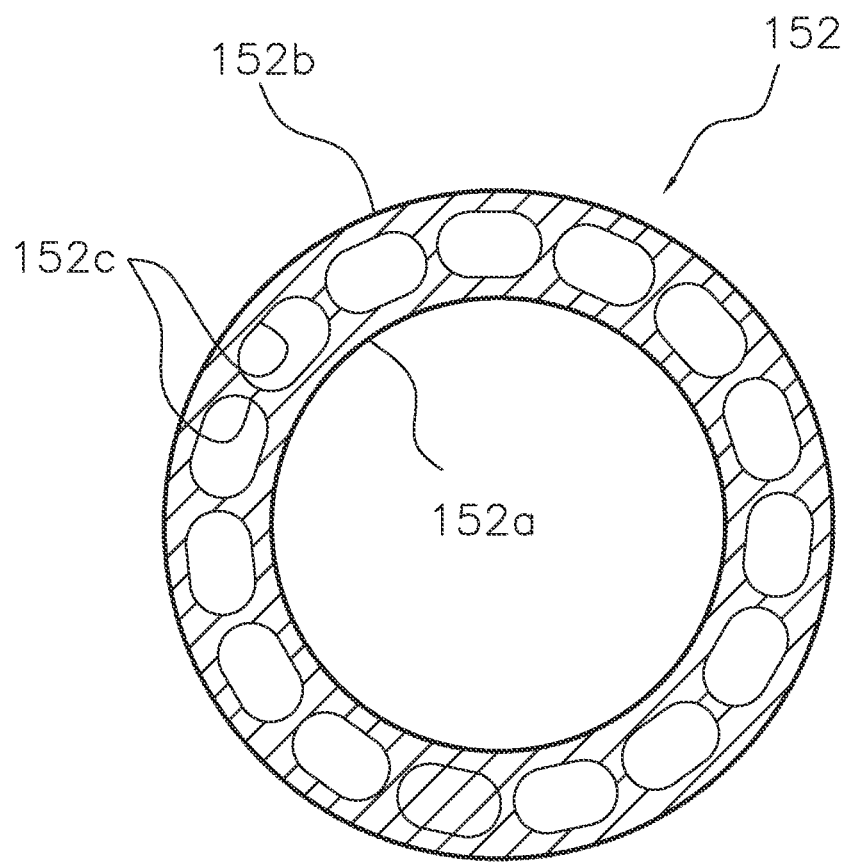
FIG. 6 is a sectional view of the bicycle rear hub taken along section line V-V in FIG. 4.

The coupling part 152 is disposed between the inside peripheral part of a second end of the hub shell 124, and the outside peripheral part of the third tubular part 140d of the first member 140. The outside peripheral part of the coupling part 152 is pressure-fit into the inside peripheral part of the second end of the hub shell 124. The outside peripheral part of the third tubular part 140d of the first member 140 is pressure-fit into the inside peripheral part of coupling part 152. By virtue of this press-fit, the coupling part 152 is coupled securely to the hub shell 124 and to the drive part 122. Therefore, in the second embodiment, no fifth bearing is provided in the rear hub 110. As shown in FIG. 6, the coupling part 152 is an annular member. The coupling part 152 has a plurality of first serrations 152a provided on the inside peripheral part thereof. The first serrations 152a form small asperities for a press-fit with the third tubular part 140d. The second coupling part 152 has a plurality of second serrations 152b provided on the outside peripheral part thereof. The second serrations 152b form small asperities for a press-fit with the inside peripheral part of the second end of the hub shell 124. As shown in FIGS. 5 and 6, the coupling part 152 has a plurality of holes 152c passing through an outside face 152d and an inside face 152e in the axial direction. The action of the holes 152c is similar to the holes 52c of the first embodiment. The holes 152c are disposed spaced apart at intervals in the circumferential direction. The outside face 152d and the inside face 152e of the coupling part 152 slope towards a first end of the hub shell 24. The outside face 152d and the inside face 152e of the coupling part 152 constitute part of a predetermined conical face. Herein, the outside face 152d has a greater slope angle with respect to the hub spindle than does the inside face 152e; however, the outside face 152d and the inside face 152e may be parallel, or the inside face 152e may have a greater slope angle with respect to the hub spindle than does the outside face 152d. The outside face 152d and the inside face 152e of the coupling part 152 may be faces orthogonal to the hub spindle.

A first signal generating mechanism 154 of a driving force measuring part 126 is disposed to the inside peripheral side of the third tubular part 140d of the first member 140 of the drive part 122. A second signal generating mechanism 156 is disposed to the inside peripheral side of the hub shell 24, and is spaced apart by a predetermined interval in the hub spindle direction from the first member 140. The first signal generating mechanism 154 has a first magnet 154a and a first coil 154b. The first magnet 154a is coupled to the inside peripheral part of the third tubular part 104d. The first coil 154b is coupled to the spindle body 30 of the hub spindle 20. The first coil 154b is disposed in opposition to the first magnet 154a on the radially inward side thereof. The first coil 154b is non-rotatably coupled to the spindle body 30. The configurations of the first magnet 154a, the first coil 154b, and the other parts are similar to those of the first signal generating mechanism 54 of the first embodiment, and as such will not be described.

The second signal generating mechanism 156 is disposed in proximity to the first signal generating mechanism 154 of the hub shell 124. The second signal generating mechanism 156 has a second magnet 156a coupled to the inside peripheral part of the hub shell 124; and second coil 156b coupled to the spindle body 30 of the hub spindle 20. The second coil 156b is disposed in opposition to the second magnet 156a, to the radially inward side thereof. The second coil 156b is non-rotatably coupled to the spindle body 30. The second magnet 156a, the second coil 156b, and the other configurations are similar to those of the second signal generating mechanism 56 of the first embodiment, and as such will not be described.

With the rear hub 110 configured according to this second embodiment, as with the first embodiment, because two sets of coils and magnets can measure the driving force in a non-contact manner, they can be relatively unaffected by accuracy of assembly.

Figure 7:
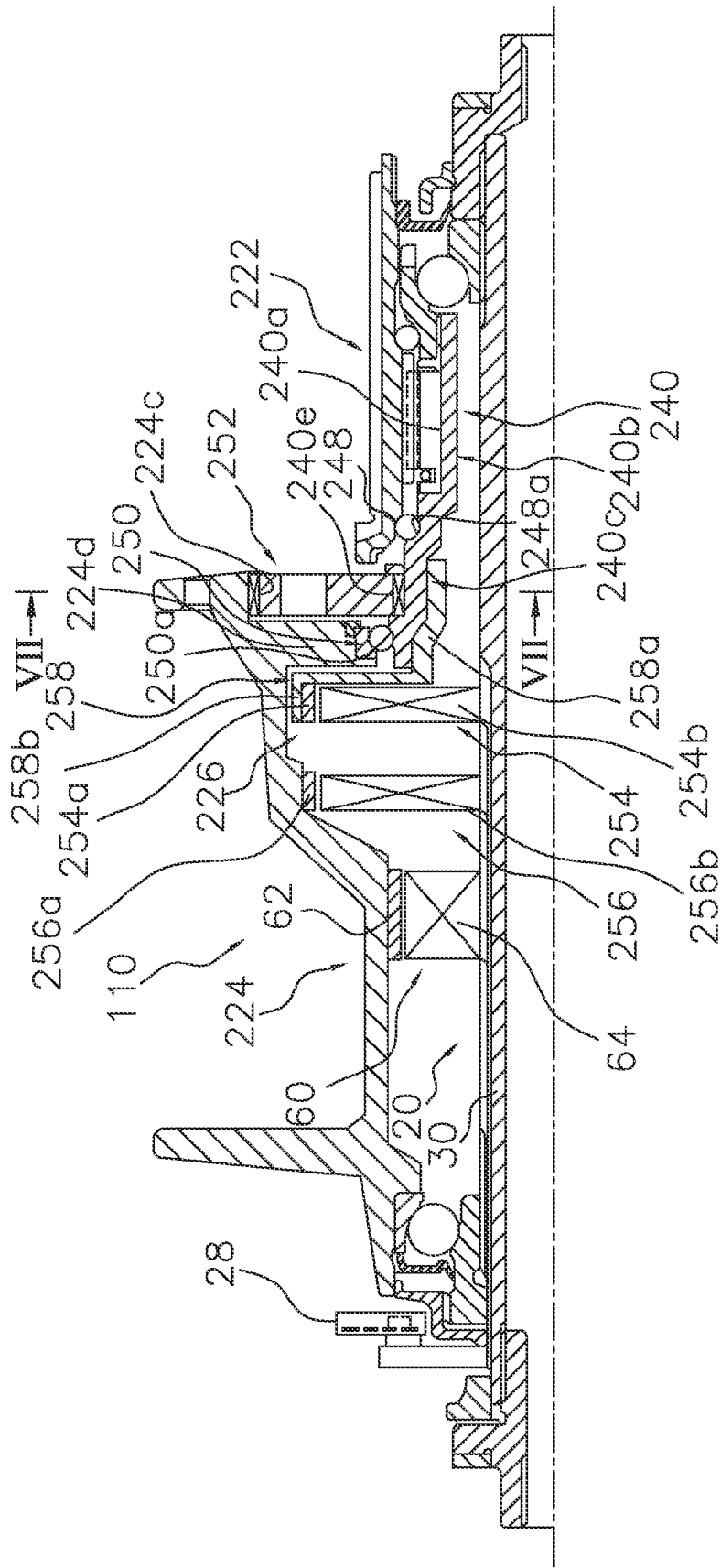
FIG. 7 is a fragmentary cross sectional view, corresponding to FIG. 2, of a bicycle rear hub in accordance with a third embodiment.

In the first and second embodiments, the first signal generating mechanism is disposed on the coupling part or at a position in proximity to the coupling part; however, in a third embodiment, a first signal generating mechanism 254 is disposed at a location away from a coupling part 252, as shown in FIG. 7.

In a rear hub 210 according to the third embodiment, a first member 240 of a drive part 222 has a first tubular part 240b provided with a recess 240a. A first end of the first member 240 (the end at the left side in FIG. 7) extends as far as the inside peripheral side of a hub shell 224. At a first end side of the first tubular part 240b (the left side in FIG. 7), the first member 240 has a second tubular part 240c larger in diameter than the first tubular part 240b. An attachment member 258 for installation of the first signal generating mechanism 254 is rotatably coupled in unison, to the inside peripheral part of the second tubular part 240c. A third cone face 248a of a third bearing 248, and a fifth cone face 250a of a fifth bearing 250, are formed on the outside peripheral part of the second tubular part 240c. First serrations 240e for coupling of the coupling part 252 are formed between the third cone face 248a and the fifth cone face 250a of the second tubular part 240c.

The attachment member 258 is a stepped member of tubular shape, having a small-diameter first portion 258a and a large-diameter portion 258b. The first portion 258a is coupled to the inside peripheral part of the second tubular part 240c, and rotates in unison with the second tubular part 240c. The first signal generating mechanism 254 is disposed to the inside peripheral side of the second portion 258b.

Figure 8:
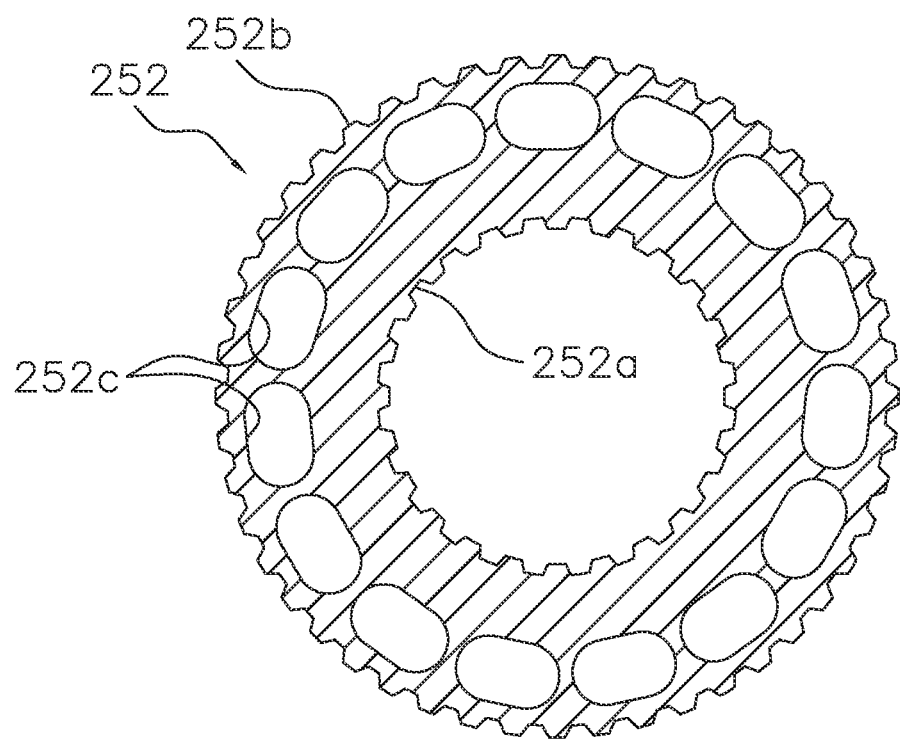
FIG. 8 is a cross sectional view of the bicycle rear hub taken along section line VII-VII in FIG. 6.

The coupling part 252 is disposed on the driving force conveying path from the drive part 222 to the hub shell 224. In the third embodiment, the coupling part 252 is disposed between the inside peripheral part of the hub shell 224 and the first member 240, at a second end of the hub shell 224 (the end on the right side in FIG. 7). The coupling part 252 is disposed to the inside in the radial direction from a flange disposed at the second end of the hub shell 224. The coupling part 252 is disposed to the second end side of the hub shell 224, with respect to a bearing support part 224d, discussed below, of the hub shell 224, and is adjacent to the bearing support part 224d. As shown in FIG. 8, the coupling part 252 is a member of annular shape having in the inside peripheral part thereof a second engaging part 252a for engaging a first engaging part 240e of the first member 240. The coupling part 252 has in the outside peripheral part thereof a fourth engaging part 252b for engaging a third engaging part 224c, discussed below, of the hill) shell 224. The coupling part 252 has a plurality of holes 252c formed spaced apart at intervals in the circumferential direction. The first engaging part 240e, the second engaging part 252a, the third engaging part 224c, and the fourth engaging part 252b are formed to a recessed/protruding shape in the radial direction of the hub spindle 20. Here, while first engaging part 240e, the second engaging part 252a, the third engaging part 224c, and the fourth engaging part 252b are formed to a recessed/protruding shape in the radial direction of the hub spindle 20, a shape having recesses or protrusions projecting in the direction of the hub spindle is acceptable, as are serrations.

The holes 252c pass through the coupling part in the hub spindle direction. The holes 252c are formed to oval shape, and the lengthwise direction thereof lies along the circumferential direction. These holes 252c reduce the rigidity of the coupling part 52 to less than that of the drive part 222 and the hub shell 224, and are disposed for the purpose of facilitating torsion of the coupling part 252 in response to driving force, when driving force (torque) is conveyed from the drive part 222 to the hub shell 24.

The hub shell 224 is a structure that is splittable in the direction of the hub spindle. On the inside peripheral part of a first end of the hub shell 224 (the end at the right side in FIG. 7), there is formed a third engaging part 224c for engaging the outside peripheral part of the coupling part 252. To the first end side from the third engaging part 224c in the hub shell 224, there is formed a bearing support part 224d of annular shape, for installation of the fifth bearing 250. The bearing support part 224d projects out to the hill) spindle 20 side at the inside peripheral part of the hub shell 224. The bearing support part 224d is formed to an annular shape. The second portion 258b of the attachment member 258 is disposed in proximity to the bearing support part 224d.

As shown in FIG. 7, the first signal generating mechanism 254 of the driving force measuring part 226 has a first magnet 254a coupled to the inside peripheral part of the second portion 258b of the attachment member 258, and rotatable in unison with the attachment member 258; and a first coil 254b coupled non-rotatably to the outside peripheral part of the spindle body 30 of the hub spindle 20.

The second signal generating mechanism 256 has a second magnet 256a coupled to the inside peripheral part of the hub shell 224, and rotatable in unison with the hub shell 224; and a second coil 256b coupled non-rotatably to the outside peripheral part of the spindle body 30 of the hub spindle 20. The second signal generating mechanism 256 is disposed in-line with the first signal generating mechanism 254 in the direction of the hub spindle. The first signal generating mechanism 254 and the second signal generating mechanism 256 of the third embodiment are similar in configuration to the first signal generating mechanism and the second signal generating mechanism of the first and second embodiments; however, the radial dimensions thereof are larger than those of the first signal generating mechanism and the second signal generating mechanism of the first and second embodiments, and therefore the number of poles can be greater, improving the accuracy of detection of the phase difference.

In the third embodiment, a generator 60 for supplying power to the wireless transmitter 28 is disposed between the hub spindle 20 and the hub shell 224. The generator 60 has a magnet 62 fastened to the inside peripheral part of the hub shell 224; and a stator 64 fastened to the outside peripheral part of the spindle body 30 of the hub spindle 20. The magnet 62 is disposed in opposition to the stator 64, to the outside peripheral side of the stator 64. The stator 64 has a coil bobbin fastened to the outside peripheral part of the hub spindle 20; a coil wound onto the coil bobbin; and a yoke disposed about the perimeter of the coil. The output of the coil is rectified to direct current by the wireless transmitter 28, and is used as a power supply.

According to the rear hub 210 of the third embodiment, because driving force can be detected in a non-contact manner by two sets of coils and magnets as in the first and second embodiments, the system can be largely unaffected by accuracy of assembly.

While the present invention has been described above in terms of certain preferred embodiments, the present invention is not limited to the previously described embodiments, and various modifications are possible within the scope and spirit of the invention.

In the previously described embodiments, the configuration of the drive part 22 includes a so-called free hub having a one-way clutch, but the present invention is not limited thereto. The present invention can be implemented, for example, in a rear hub lacking a free hub.

In the previously described embodiments, a rear hub having a quick release mechanism 29 is shown by way of example; however, the present invention can be implemented in a rear hub lacking a quick release mechanism.

In the previously described embodiments, a generator and a rechargeable battery are shown by way of examples of the power supply, but the present invention is not limited thereto. A rechargeable capacitor or other such storage element may be employed as well, for example. A non-rechargeable primary battery may be employed as the power supply as well.

In the previously described third embodiment, the generator 60 was employed to supply electrical power to the wireless transmitter 28, but the present invention is not limited thereto. Instead, the wireless transmitter may detect the electrical power waveform of the alternating current output by the generator 60, and obtain a rotation speed signal for the rear hub. Information relating to the rotation speed signal obtained thereby, and torque representing the driving force measured by the driving force measuring part, may then be employed by the microcomputer to calculate the power. Additionally, by having the wireless transmitter transmit the information relating to the rotation speed signal to the cycle computer, which performs multiplication by the circumferential length of the rear wheel, the information can be employed for display of wheel speed by the cycle computer.

A rotation speed signal of the rear hub may also be obtained from the output of the first signal generating mechanism or the second signal generating mechanism.

The configurations taught in each of the previously described embodiments can be combined with one another. For example, the first or second embodiment may be disposed with a generator inside the hub shell, as taught in the third embodiment. In this case, a configuration in which the hub spindle is disposed with a magneto coil, and the hub shell or the first member is disposed with a magnet, can be adopted for the generator. Moreover, in the third embodiment, a primary battery or a secondary battery may be disposed in place of the generator. Additionally, for example, in the first to third embodiments, the magnet may be disposed to the hub spindle, and the coil disposed to the hub shell or the drive part.

In the previously described embodiments, holes that pass through the coupling part are formed in the coupling part; however, configurations in which recesses are formed in place of through-holes, or in which no holes are disposed, are also acceptable.

In the previously described embodiments, any one or several of the first to fifth bearings may be modified to sliding bearings. Weight can be reduced in this case.

In the previously described embodiments, the section constituting the freewheel in the first member may be configured to be detachable from the other section. With this configuration, the freewheel can be replaced without constraint. The detachable section in the first member may be joined to the other section by a linking mechanism such as serrations.

Thus, the foregoing descriptions of the embodiments according to the present invention are provided for illustration only, and not for the purpose of limiting the invention as defined by the appended claims and their equivalents.

What is claimed is:

1. A bicycle rear hub comprising:
    a hub spindle;
    a drive part rotatably supported on the hub spindle, the drive part including a first member, a second member and a one-way clutch operatively coupled between the first and second members, the second member of the drive part being configured to receive a driving-force-input member;
    a hub shell rotatably supported on the hub spindle and operatively coupled to the drive part for rotation by the drive part on the hub spindle; and
    a driving force measuring part including
        a first signal generating mechanism having a first magnet and a first coil, the first signal generating mechanism being coupled to the first member of the drive part, and
        a second signal generating mechanism having a second magnet and a second coil, the second signal generating mechanism axially aligned with the first signal generating mechanism in an axial direction of the hub spindle.

2. The bicycle rear hub as recited in claim 1, wherein either the first magnet or the first coil is disposed on the drive part, and the remaining first magnet or the first coil is disposed on the hub spindle.

3. The bicycle rear hub as recited in claim 1, wherein the drive part has a coupling part coupled to the hub shell.

4. The bicycle rear hub as recited in claim 3, wherein the first signal generating mechanism is coupled to the coupling part.

5. The bicycle rear hub as recited in claim 4, wherein either the first magnet or the first coil is disposed on the coupling part, and the remaining first magnet or the first coil is disposed on the huh spindle.

6. The bicycle rear hub as recited in claim 3, wherein the second signal generating mechanism is coupled to the coupling part.

7. The bicycle rear hub as recited in claim 6, wherein either the second magnet or the second coil is disposed on the coupling part, and the remaining second magnet or the second coil is disposed on the hub spindle.

8. The bicycle rear hub as recited in claim 1, wherein the second signal generating mechanism is coupled to the hub shell.

9. The bicycle rear hub as recited in claim 8, wherein either the second magnet or the second coil is disposed on the hub shell, and the remaining second magnet or the second coil is disposed on the hub spindle.

10. The bicycle rear hub as recited in claim 1, wherein the first signal generating mechanism and the second signal generating mechanism are disposed on the interior of the hub shell.

11. The bicycle rear hub as recited in claim 1, wherein the first magnet and the second magnet are formed to annular shape, and a plurality of magnetic poles are formed in-line in the circumferential direction.

12. The bicycle rear hub as recited in claim 1, further comprising
    a wireless transmitter for wirelessly transmitting, to the outside, information based on an output of the first coil and the second coil.

13. The bicycle rear hub as recited in claim 12, further comprising
    a power supply for supplying power to the wireless transmitter.

14. The bicycle rear hub as recited in claim 13, wherein the power supply is a battery.

15. The bicycle rear hub as recited in claim 13, wherein the power supply is a generator.

* * * * *